United States Patent [19]

Brown et al.

[11] Patent Number: 5,621,539
[45] Date of Patent: Apr. 15, 1997

[54] PUBLIC FAX SERVICES AND SYSTEM

[75] Inventors: David A. Brown, Indianapolis, Ind.; Nasrin Hoque, Old Bridge, N.J.; Hans K. Keipert, Indianapolis, Ind.; Fred Remite, Jr., Freehold Township, N.J.; Frank S. Simone, Somerville, N.J.; Bruce D. Wycherley, Wanamassa, N.J.

[73] Assignee: AT&T, Middletown, N.J.

[21] Appl. No.: 690,088

[22] Filed: Jul. 31, 1996

Related U.S. Application Data

[63] Continuation of Ser. No. 260,164, Jun. 15, 1994, abandoned, which is a continuation of Ser. No. 871,155, Apr. 20, 1992, abandoned.

[51] Int. Cl.$^6$ ..................................................... H04N 1/00
[52] U.S. Cl. .......................... 358/400; 358/434; 379/100
[58] Field of Search ................................... 358/400, 401, 358/407, 434, 435, 436, 438, 439, 440; 379/100, 142

[56] References Cited

U.S. PATENT DOCUMENTS

| | | |
|---|---|---|
| 3,752,904 | 8/1973 | Waterbury ................................. 178/5.1 |
| 3,896,266 | 7/1975 | Waterbury ................................... 179/1 |
| 4,439,636 | 3/1984 | Newkirk et al. ......................... 179/7.1 |
| 4,532,379 | 7/1985 | Tsukioka ................................. 358/440 |
| 4,823,376 | 4/1989 | Takahashi ............................... 358/400 |
| 4,902,881 | 2/1990 | Janku ..................................... 235/381 |
| 4,994,926 | 2/1991 | Gordon et al. .......................... 358/400 |
| 5,003,595 | 3/1991 | Collins et al. .......................... 379/142 |
| 5,050,207 | 9/1991 | Hitchcock ................................. 379/98 |
| 5,168,376 | 12/1992 | Motohama .............................. 358/437 |
| 5,216,517 | 6/1993 | Kinoshita et al. ...................... 358/440 |

FOREIGN PATENT DOCUMENTS

WO8605344  9/1986  European Pat. Off. ......... H04N 1/44

*Primary Examiner*—Thomas D. Lee
*Attorney, Agent, or Firm*—Michele Conover

[57] ABSTRACT

A public facsimile machine is arranged so that it will only receive an incoming facsimile if the facsimile is preceded by a predetermined security code. In addition, the public facsimile machine is associated with an enhanced facsimile service so that the capabilities provided by such a service, for example, broadcasting a facsimile to a plurality of destinations, may be offered to a user of the public facsimile machine.

10 Claims, 12 Drawing Sheets

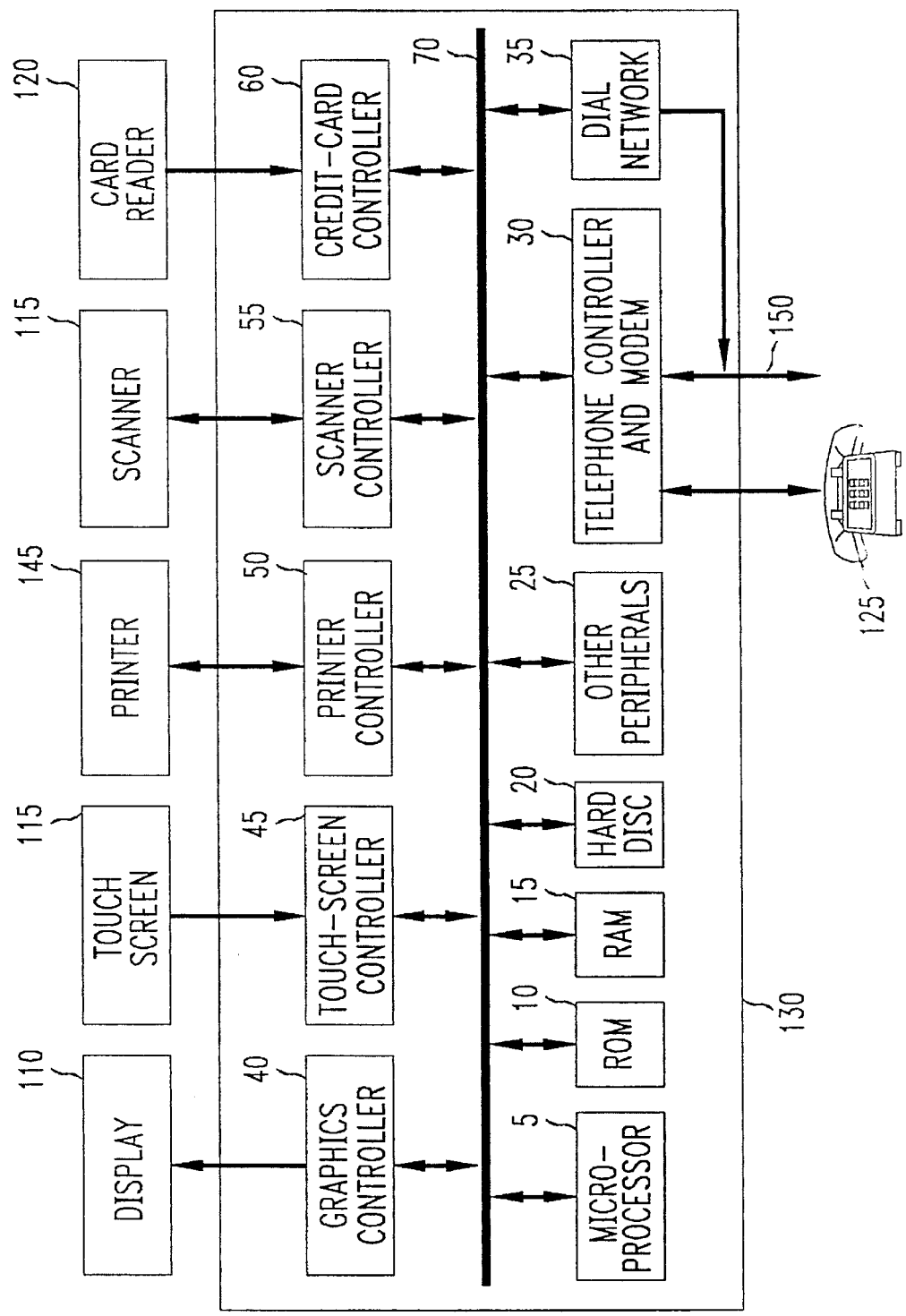

PUBLIC FAX SERVICES AND SYSTEM

This application is a continuation of application Ser. No. 08/260164, filed on Jun. 15, 1994 now abandoned, which is a continuation of application Ser. No. 07/871155, filed on Apr. 20, 1992, now abandoned.

TECHNICAL FIELD

The invention relates to the transmission and receipt of facsimile documents and particularly relates to a facsimile system that may be accessed by the public.

BACKGROUND OF THE INVENTION

Facsimile systems are now being located in various public places, for example, airports and hotels, for use by the general public. Accordingly, a person who happens to be in an airport or hotel and who needs to send or receive a facsimile of a document (hereinafter referred to as sending a "facsimile") may now do so. A public facsimile system typically employs a broadcast mode which allows a person (user) to send a facsimile of a document to a number of different destinations identified by the user. In doing so, the public facsimile system places a telephone call to each such destination and transmits a facsimile of the user's document thereto. It can be appreciated that if the number of such destinations is appreciable, then it will take an appreciable amount of time for the public facsimile system to complete its task. It can also be appreciated that if a number of other users are waiting to use the public facsimile system, then the delay that arises as a result of the aforementioned broadcast may cause one or more of such other users to forgo using the public facsimile system. As such, the public facsimile system would lose revenue as a result of such nonuse.

As mentioned above, a public facsimile system may also be used to receive a facsimile of a document. Typically, a user who desires to receive a copy of a document via a public facsimile system first places a call to another person who has access to the document and then passes to the latter the telephone number of the public facsimile system. (In most instances, the telephone call may be placed via the public facsimile system.) Upon completing the call, the user then places the public facsimile system in a receive ready mode to await receipt of the intended transmission. The other person, in a conventional manner, may then transmit, via his/her facsimile machine, a copy of the desired document to the identified public facsimile system. The public facsimile system then prints and outputs a printed version of the received facsimile. It can be appreciated that, for whatever reason, the transmission of the facsimile could be delayed. If the delay is an appreciable amount of time, then the public user might be prompted to proceed to a public telephone in order to place a telephone call to the sender to ascertain the reason for the delay. It can also be appreciated that in such a situation the public facsimile system could receive the facsimile and output a copy thereof during the time that the user is placing the telephone call to the sender. As such, the copy could be intercepted by another person.

SUMMARY OF THE INVENTION

An advance in the art is achieved by arranging a public facsimile system so that, in accord with an aspect of the invention, it accepts receipt of a facsimile via a transmission path only if it receives a predetermined security code prior to the transmission of the facsimile. Specifically, the public facsimile system controls the transmission of a facsimile by supplying a unique security code to a user desiring to receive a facsimile via the public facsimile system. The user then supplies the security code to the sender of the facsimile. The sender of the facsimile then places a telephone call to the public facsimile system and enters the security code when requested to do so. If the public facsimile system finds that the security code that it receives from the sender compares with the security code that it supplied to the user, then the public facsimile system signals the sender to begin the transmission of the facsimile. Otherwise, the public facsimile system terminates the telephone call.

In accord with another aspect of the invention, the public facsimile system is associated with an enhanced facsimile service of the type capable of broadcasting a facsimile to a plurality of destinations. In this way, the public facsimile system may quickly process a facsimile that is to be sent to a plurality of destinations by sending the facsimile, as well as the telephone numbers of the intended destinations, to the enhanced facsimile system. The enhanced facsimile system then sends the facsimile to each of the destinations.

BRIEF DESCRIPTION OF THE DRAWING

In the drawing:

FIG. 12 is a more detailed block diagram of the public facsimile system of FIG. 1.

DETAILED DESCRIPTION

Figure 1:
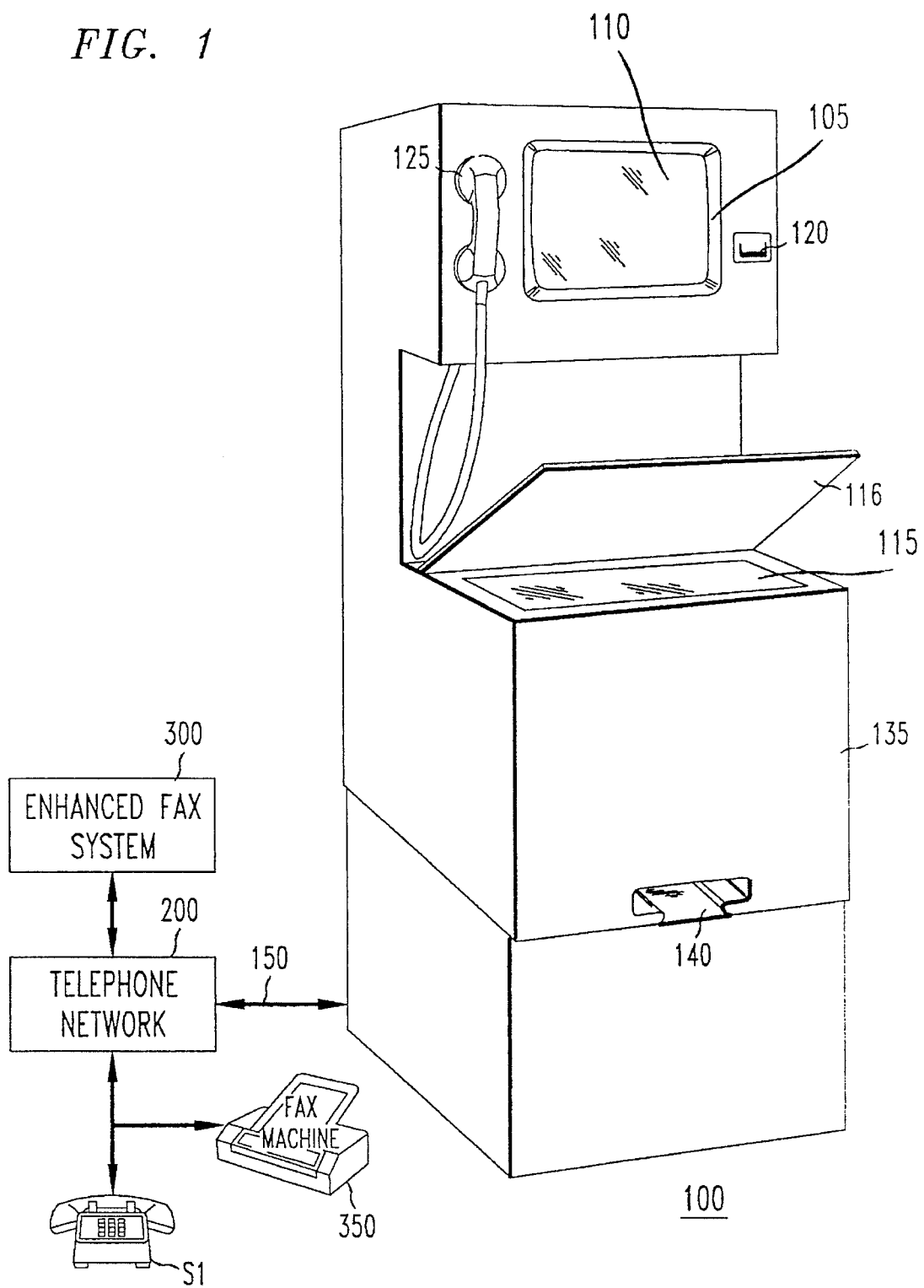
FIG. 1 is a broad block diagram of a public facsimile system arranged in accordance with the principles of the invention.

Public Facsimile System (PFS) 100 illustrated in FIG. 1 includes card reader 120 and document scanner 115 with cover 116. It also includes a printer (not shown in FIG. 1) which is disposed within housing 135 and which provides via chute 140 a printed version of a facsimile that a user may receive via PFS 100. The overall operation of PFS 100 is under the control of a computer 130 (shown in FIG. 12), which is also disposed within housing 135. Computer 130, which may be, for example, the Model PFI386SX16 computer available from Diamond Flower, Inc., of Korea, operates under a predetermined operating system—illustratively the well-known MS-DOS operating system. Computer 130 includes display (or monitor) 110 and touch screen 105 which overlays the face of display 110. The display and touch screen, more particularly, provide a mechanism for a user to input information in response to instructions that computer 130 displays on display 110, in which the information and instructions relate to either the transmission or receipt of a facsimile.

Associated with PFS 100 is a telephone 125. Telephone connectors (not shown) disposed within housing 135 provides a means for connecting telephone 125 with telephone line 150 extending to public switched telephone network 200. Thus, PFS 100, under the direction of a user, may establish via network 200 a telephone connection to other facsimile equipment, e.g., facsimile machine 350 associated with station S1, for the purpose of sending or receiving a facsimile. PFS 100 may also establish via network 200 a telephone connection to a conventional Enhanced Facsimile (EFAX) system 300, which may be, for example, the well-known enhanced FAX service provided by AT&T. Among the features of the AT&T Enhanced FAX service is the providing to a user the ability to broadcast a facsimile to a number of intended recipients. That is, a subscriber sends a facsimile to system 300 as well as the telephone numbers of the intended recipients. Thereafter, system 300 establishes a telephone connection to each such recipient and transmits the subscriber's facsimile thereto. Accordingly, the subscriber needs only to transmit the facsimile once to system 300, rather than to each such recipient. PFS 100 takes advantage of the system 300 broadcast capability, and other capabilities, by subscribing to that service and offering such capabilities to a PFS 100 user who is not a system 300 subscriber. Thus, in accord with an aspect of the invention, PFS 100 does not broadcast a FAX to a number of destinations, but merely supplies the FAX and destination telephone numbers to system 300, as will be explained below.

As another system 300 feature, a subscriber thereof may receive a facsimile that had been stored in a so-called system 300 "mailbox" associated with the subscriber. That is, the subscriber may place a telephone call to system 300 via PFS 100 to determine if one or more facsimiles are stored in the subscriber's mailbox. If that is the case, then the subscriber may direct system 300 to transmit them to PFS 100, as will be explained below.

Figure 8:
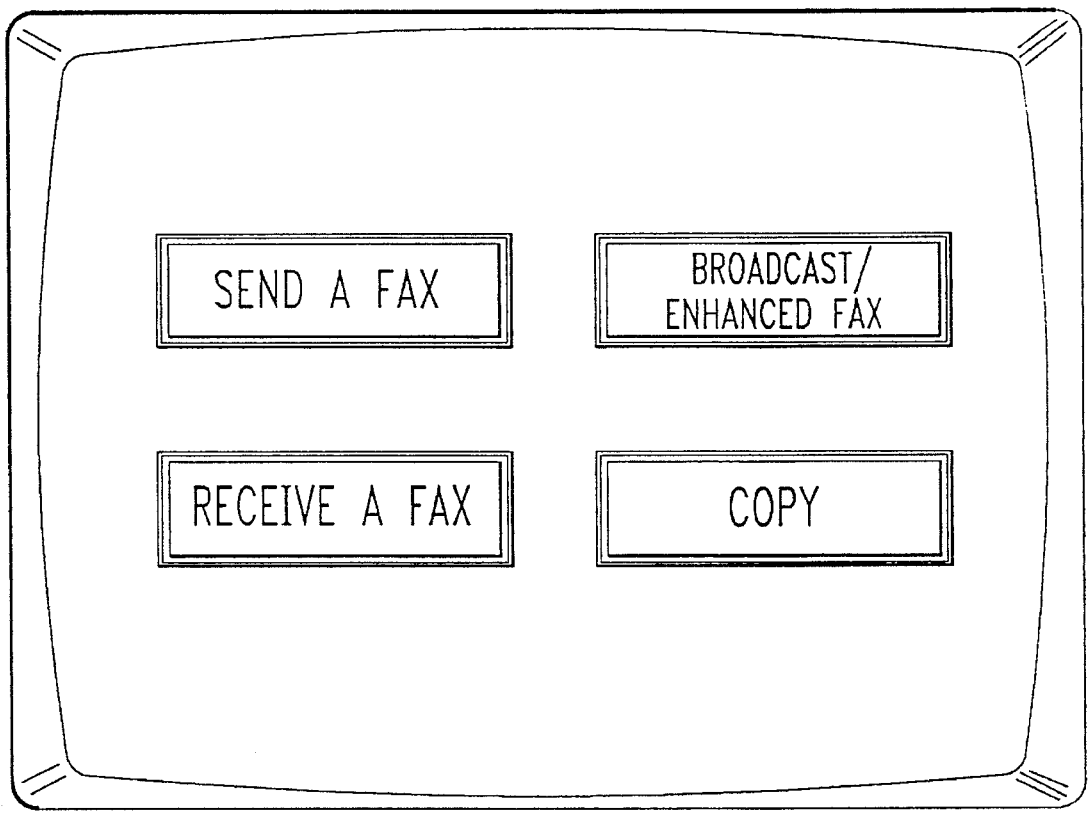
FIGS. 8 through 11 are illustrative examples of the screens that the program of FIGS. 2 through 7 display on the display of the public facsimile system.

More specifically, when PFS 100 is turned on and after computer 130 has completed some initial tasks, including the "booting up" of the operating system from an associated hard disk unit (not shown in the FIG.), the operating system invokes the program which implements the invention in computer 130. An illustrative embodiment of such a program is shown in flow chart form in FIGS. 2 through 7. In particular and beginning with FIG. 2, when the program is entered at block 200 it proceeds to block 201 where it displays on display 110 a service logo and a "Start" button. The program then proceeds to block 202 where it waits for receipt of a signal indicating that a user has touched touch screen 105 at a point which overlays the displayed Start button. That is, a user desiring to send or receive a facsimile (hereinafter also referred to as a "FAX") via PFS 100 may do so by touching touch screen 105 at the aforementioned point. Touch screen 105, in response thereto, supplies a signal to processor 130. Processor 130, in turn and in a conventional manner, correlates receipt of the signal with the display of the Start button on display 110. As a result thereof, the program proceeds to block 203 where it displays a menu of services provided by PFS 100 (an illustrative example of such a menu is shown in FIG. 8). The displayed menu includes such service items as "Send a FAX", "Receive a FAX", and "Copy". It also includes a menu item which allows a user to "Broadcast" a FAX to a number of destinations or access an enhanced FAX service, such as Enhance Fax (EFAX) system 300 shown in FIG. 1.

Following the display of the aforementioned menu items the program then enters a loop comprising blocks 204 and 205, during which the program waits a predetermined amount of time (e.g., 10 second s) for the user to select one of the displayed menu items. If the user does not do so within the allotted time, then the program returns to block 201.

The user may invoke one of the displayed services by merely touching, or pointing to, touch screen 105 at a point which overlays the desired service item. (The term "points to" and variants of that term as used herein is meant to include other terms that are understood by the art and which define similar functions. For example, it includes such notions as moving a screen cursor to the location of displayed text or to an entry in a menu of displayed entries and operating, for example, an enter key; as "touching" the screen as one would touch screen 105; or even as identifying particular displayed text or a menu item using terminal buttons, for example, a computer keyboard button.) If the user points to one of the displayed service items within the allotted time, then the program notes the selected menu item and proceeds to block 206 where it displays instructions indicating how the user may enter his/her credit card (or telephone calling card) number by operating a displayed keypad or by inserting the credit card (or calling card) in credit card reader 120 (FIG. 1). Following entry of the user's credit card (or calling card) number, the program proceeds to block 207 where it determines in a conventional manner whether the user's card is valid.

That is, the program establishes via telephone line 150 a telephone call to a conventional credit bureau and sends the user's credit (or calling) card number to the bureau via the established telephone connection. If the card is valid, then the bureau returns a validating signal. Otherwise, the bureau returns an invalidating signal. Receipt of the latter signal causes the program at block 207 to display a message indicating that the user's credit card is invalid. The program then returns to block 201. Receipt of the former signal, on the other hand, causes the program to proceed to one of the blocks 208 through 211 based on which of the displayed service items the user selected.

Figure 3:
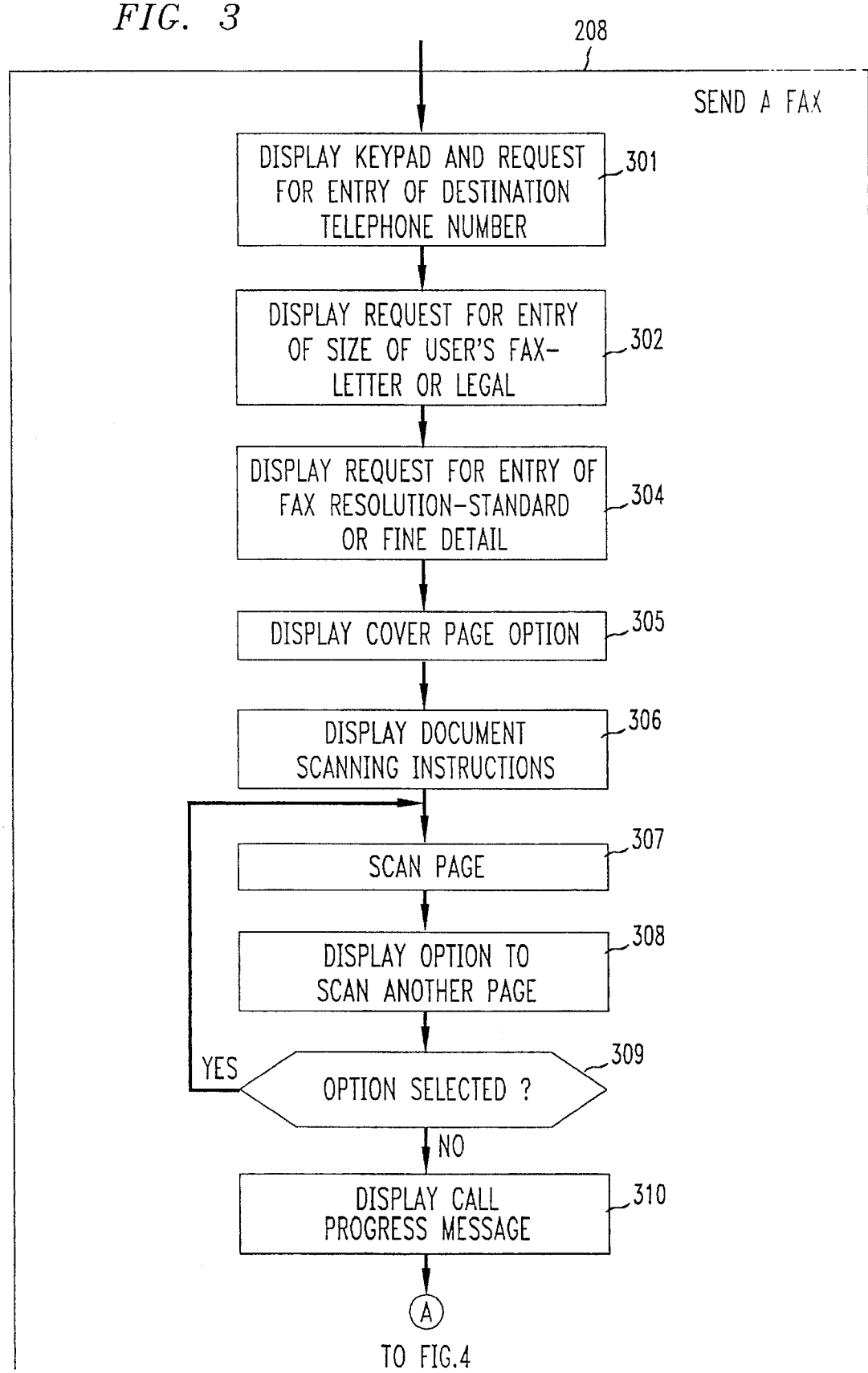
Figure 4:
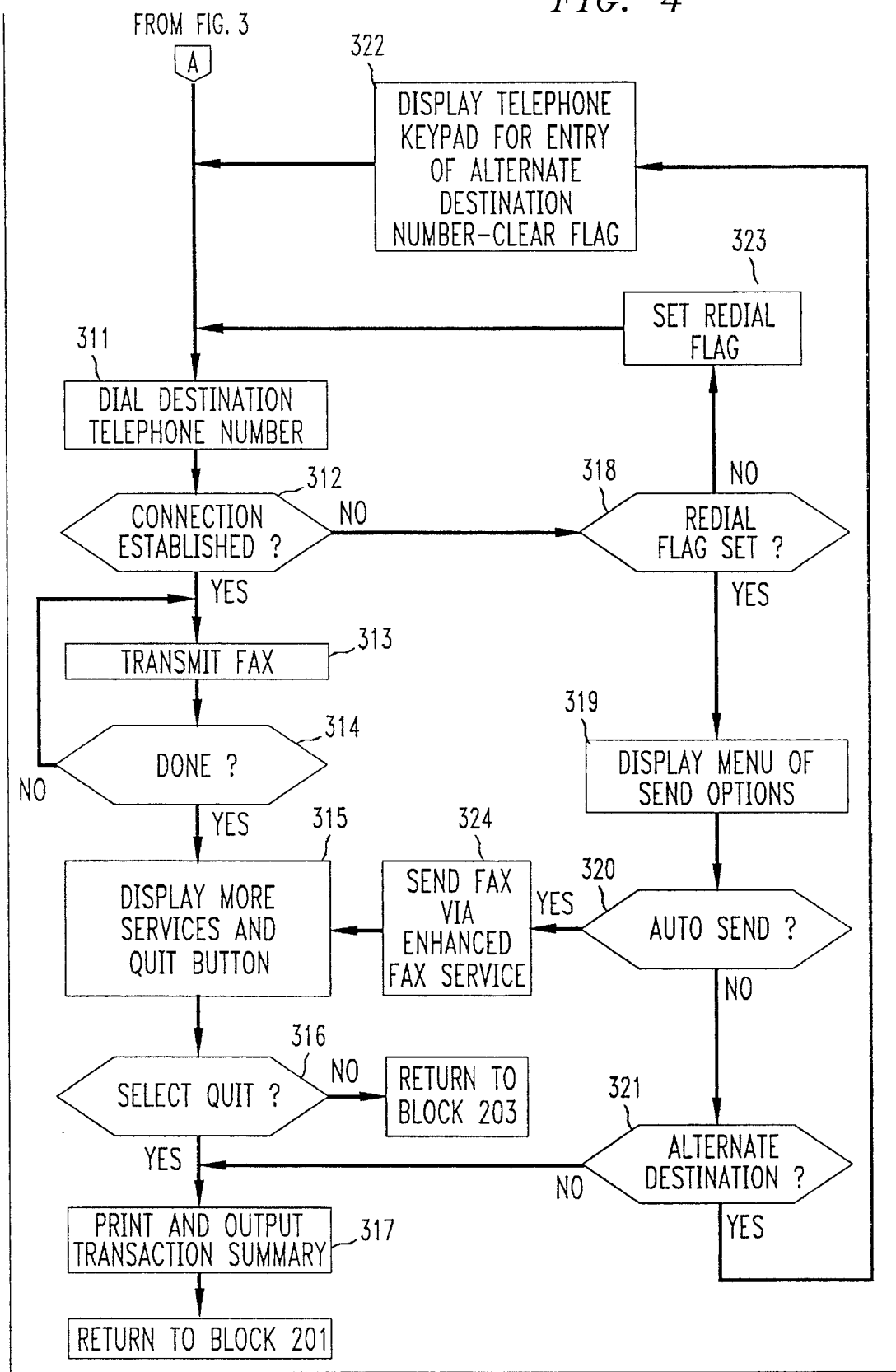

Assuming that the user selected "Send a FAX" then the program proceeds to block 208. An expanded version of block 208 is shown in FIGS. 3 and 4. In particular, at block 301 the program displays a keypad and instructions for entering the telephone number of the destination that is to receive the user's FAX. The user enters the destination telephone number by pointing to respective digits of the displayed keypad. Upon entry of the last such digit, the program then proceeds to block 302 where it displays (a) two buttons respectively designated "Legal" and "Letter", and (b) instructions for entering the size, legal or letter, of the FAX that is to be sent to the identified destination. The program then proceeds to block 304 upon the user pointing to a desired one of the displayed buttons.

At block 304, the program displays two buttons respectively designated "Standard" and "Fine" so that the user may specify the resolution of the FAX that is to be sent. When the user selects one of the displayed buttons (i.e., by pointing to it) then the program proceeds to block 305 where it prints and outputs via chute 140 (FIG. 1 ) a FAX cover page based on whether or not the user points to an appropriate displayed option. If the user declines the option, then the program proceeds to block 306. If the user selects the option, then, as mentioned, the program outputs a cover sheet to chute 140. The program then proceeds to block 306.

At block 306, the program displays instructions for causing PFS 100 to scan the page(s) of the document that the user desires to send. That is, the displayed instructions instruct the user to (a) lift scanner cover 116, (b) place the first page of the document to be sent (which might be the aforementioned cover page) face down on a conventional glass platen of scanner 115, (d) then lower scanner cover 116 to its original position, and (e) touch a displayed "Enter" button. The program, responsive to the user pointing to the displayed Enter button, proceeds to block 307 where it scans, in a conventional manner, the document positioned on the scanner glass platen. In doing so, the program notes the progress of such scanning on display 110. When the scanner has completed scanning the document, it then proceeds to block 308 where it instructs the user via display 110 to replace the scanned document with the next page, if any, and then touch the aforementioned Enter button. The program at block 309 and in response to the user pointing to the enter key, returns to block 307 for the scanning of the next page of the FAX that the user desires to send. The program continues to loop through blocks 307, 308 and 309 until it has scanned the last page of the document (FAX) that the user desires to send. That is, the program at block 309 proceeds to block 310 upon determining that the user has pointed to a displayed "End" button.

At block 310, the program notifies the user via display 110 that a telephone call is being established to the identified destination and then proceeds to block 311. At block 311, the program in a conventional manner places telephone line 150 in a so-called off-hook state and then dials the destination number. The program then waits at block 312 and proceeds to block 313 upon PFS 100 detecting that a carrier signal is being received via the established telephone connection. The program, on the other hand, proceeds to block 3 18 if the received signal is a so-called busy signal.

At block 313, the program waits for PFS 100 and the called destination to exchange various codes as well as phasing and training signals to establish a mutually acceptable operating mode including the transmission rate that will be used for the sending of the FAX. When the operating mode is established, then the program causes the first page of the scanned document to be transmitted to telephone line 150 via a PFS 100 modem circuit. The program then proceeds to block 314 to determine if it is done. That is, if it has transmitted the last page of the document scanned at block 307. If that is the case, then the program proceeds to block 315. Otherwise, the program returns to block 313 to transmit the next page of the user's document.

Figure 2:
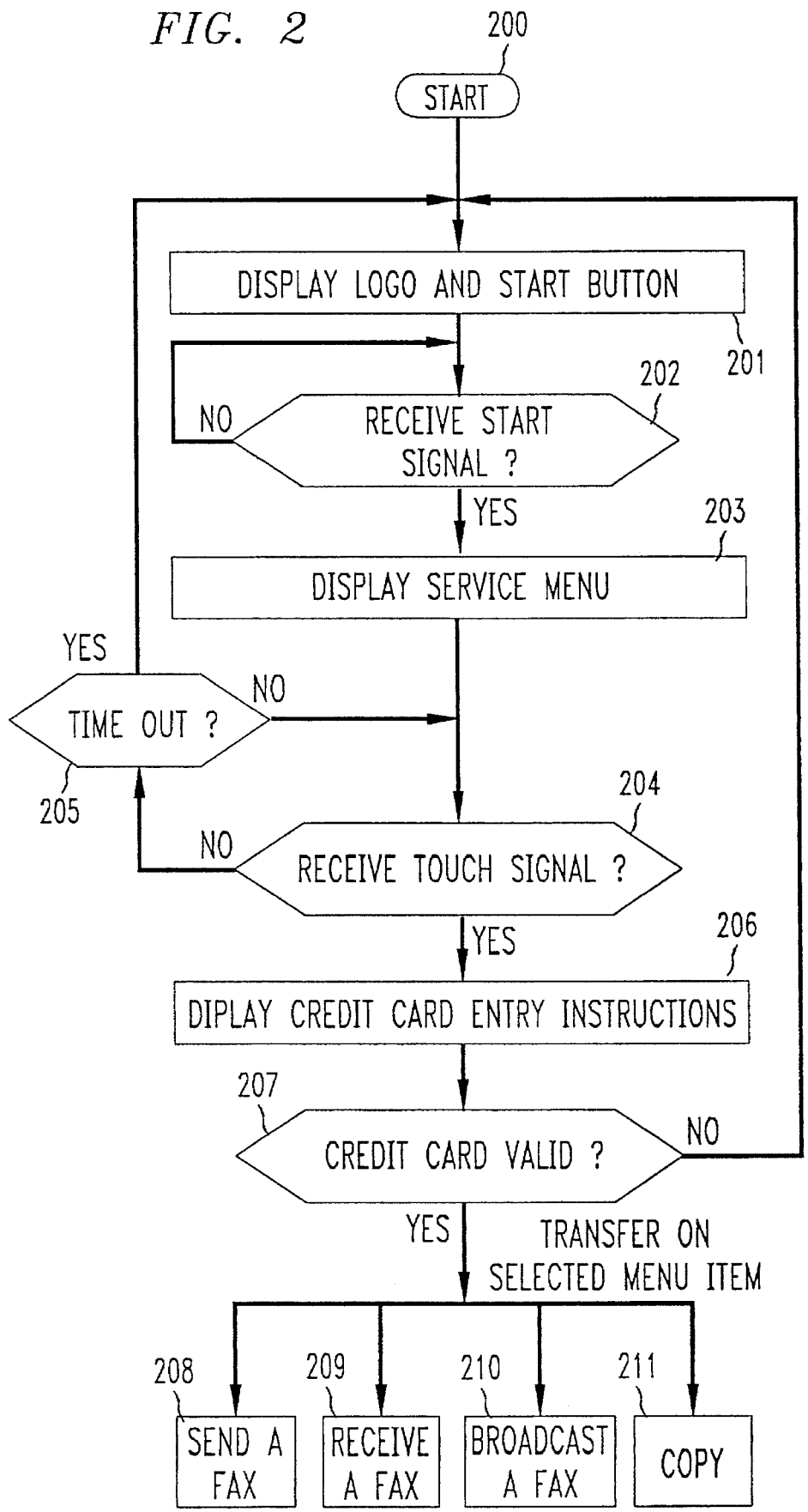
FIGS. 2 through 7 illustrate in flow chart form the program which implements the invention in the public facsimile system of FIG. 1.

At block 315, the program displays two buttons respectively designated "More Services" and "Quit". The program then proceeds to block 316 to wait for the user to select one of the displayed buttons. If the user points to the "Quit" button, then the program proceeds to block 317. If, on the other hand, the user points to the "More Services" button, then the program proceeds to block 203 (FIG. 2).

At block 317, the program causes PFS 100 to print and output to chute 140 a statement of the user's transaction as well as the cost associated therewith. The program then proceeds to block 201.

At block 318, the program checks to see if a so-called redial flag had been set as a result of trying to redial the current destination. If the flag is not set, then the program proceeds to block 323 where it sets the redial flag and then returns to block 311 to redial the current destination number. Otherwise, the program proceeds to block 319, where it displays on display 110 a menu of options including an option to send the FAX to an alternate destination or to automatically send (autosend) the FAX via an enhanced fax service, such as EFAX system 300. The displayed menu also includes an option to "Quit". The program then waits for the user to select one of the displayed options. When the user selects an option, the program determines which option the user selected by way of blocks 320 and 321. That is, at block 320, the program proceeds to block 324 if the user selects the autosend option. If the user does not select the latter option, then the program leaves block 320 and proceeds to block 321. At block 321, the program proceeds to block 322 if it finds that the user selected the alternate destination option. Otherwise, the program proceeds to block 317 as a result of concluding that the user selected the Quit option.

At block 322, the program redisplays the aforementioned telephone keypad as well as instructions for entering the alternate destination number. The program then resets (clears) the redial flag and returns to block 311 to place a telephone call to the alternate destination. The program then proceeds in the manner described above. At block 324, the program places a telephone call to system 300 via telephone line 150 and network 200. When the connection is established, the program then waits a predetermined period of time—illustratively 5 seconds—for system 300 to transmit an announcement requesting entry of a subscriber password and identification number (ID). At the end of that period of time, the program causes PFS 100 to transmit over line 150 the system 300 subscriber password and ID assigned to PFS 100. The program also causes PFS 100 to transmit the destination telephone number entered by the user. The password, ID and destination number are delimited from one another by transmitting a pound (#) sign and by transmitting a star (*) sign and then the pound sign at the end of the destination number. At that point, PFS 100 and system 300 negotiate, in the manner discussed above, an operating mode. Once an operating mode is established, PFS 100 transmits the user's facsimile to system 300.

During the transmission, the program displays on display 110 the fact that it is transmitting the user's FAX. The program also displays (a) the telephone number of EFAX system 300, and (b) a message indicating that 6) the user may call EFAX system 300 to verify delivery of the user's FAX, and (ii) a unique reference number will be printed on the transaction summary that is outputted at block 317. Following the foregoing, the program proceeds to block 315.

Figure 5:
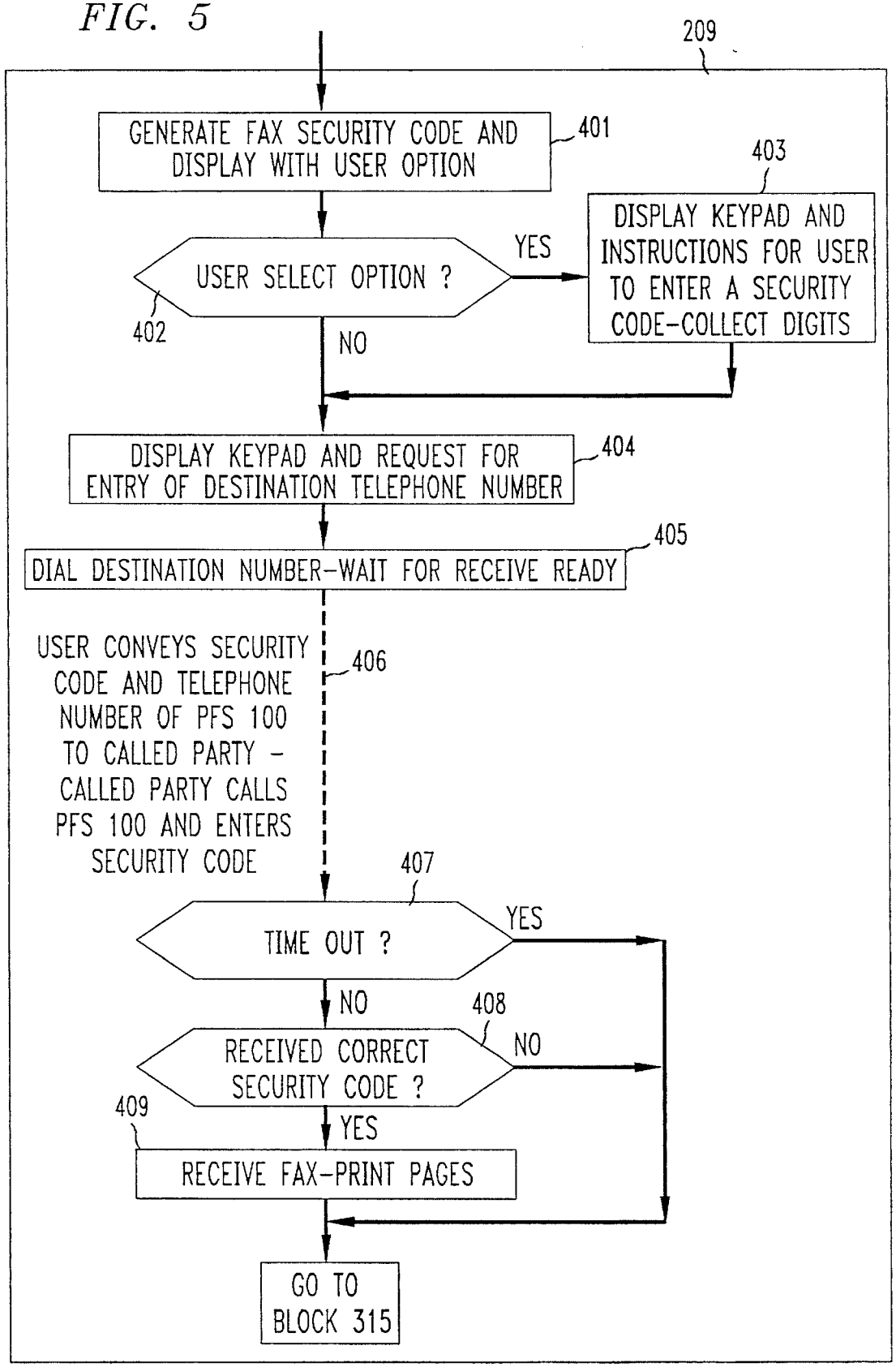
Figure 6:
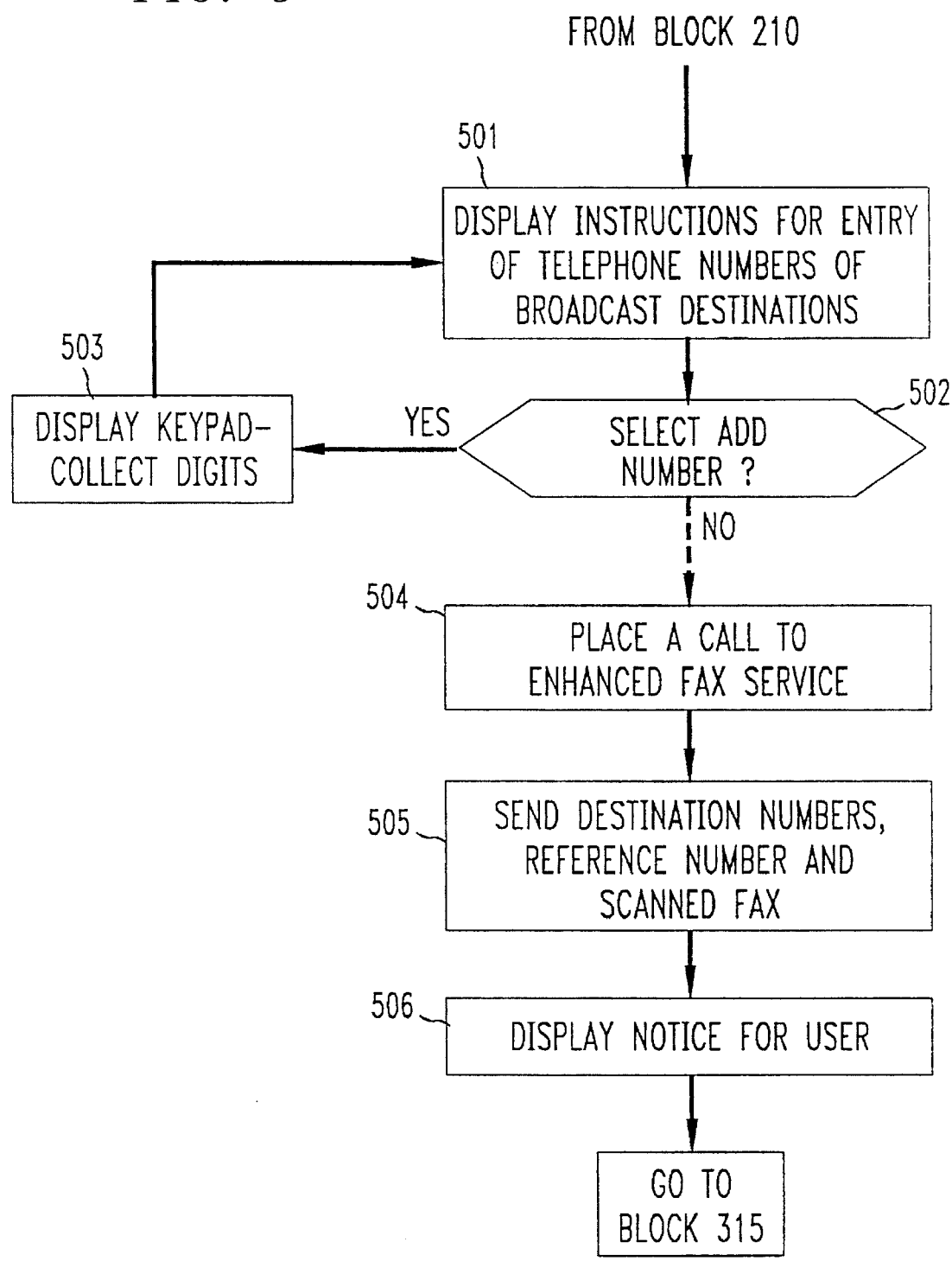
Figure 7:
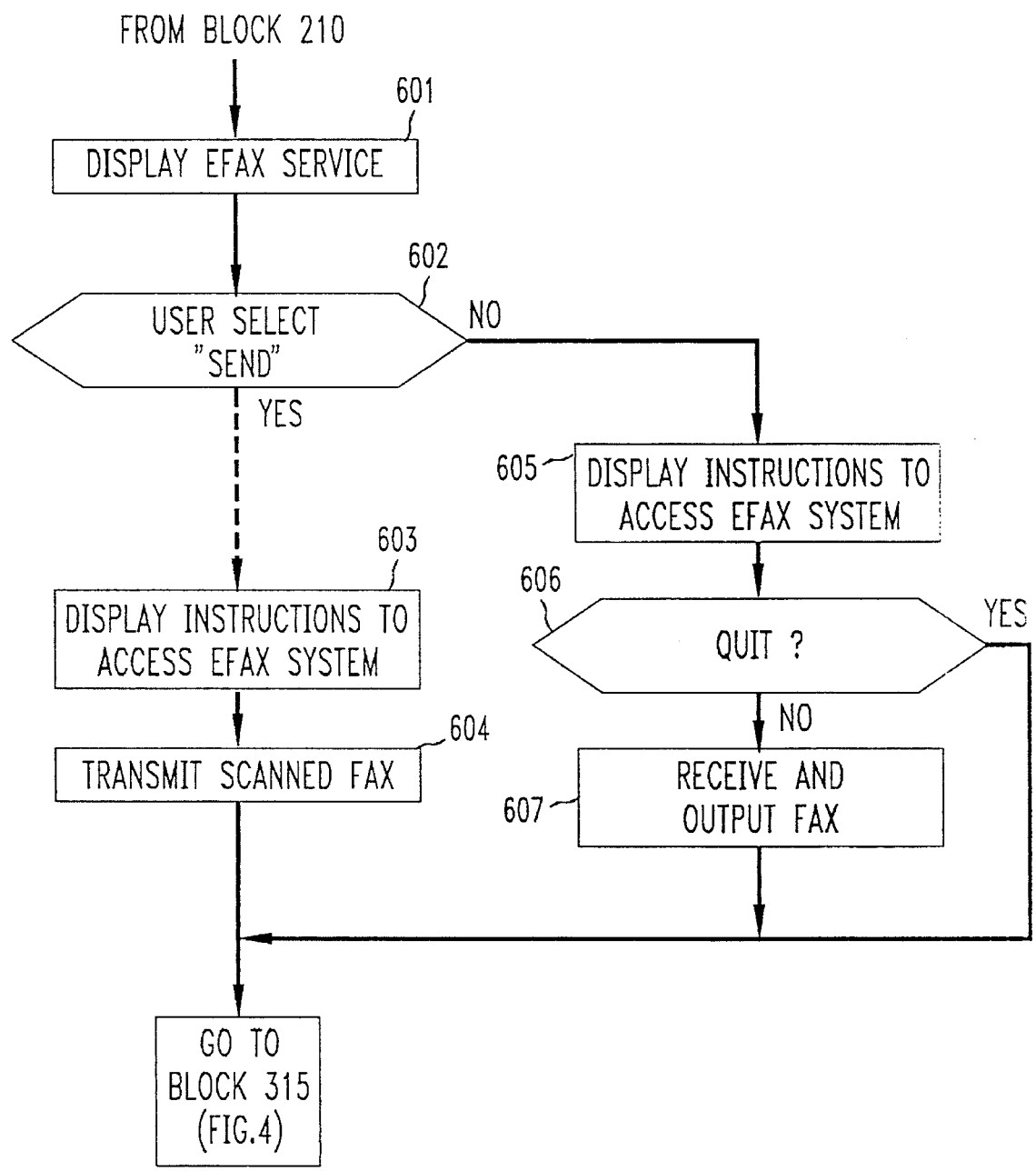

Returning to FIG. 2, if the user, on the other hand, elects to receive a FAX via PFS 100, then the program proceeds from block 207 to block 209. An expanded version of block 209 is shown in FIG. 5.

In particular, the program at block 401 generates, in accord with an aspect of the invention, a security code and displays the code on display 110. The program also displays instructions for entering a user-generated security code. If the user elects to enter his/her own security code then the program proceeds to block 403 where it displays the aforementioned keypad and instructions for entering a security code. The program then waits for the user to enter the code. When the user does so, the program collects the digits forming the code and stores them in an associated memory register. The program then proceeds to block 404 where it redisplays the keypad and displays instructions for entering the telephone number of the destination that will transmit the FAX. Similarly, the program then waits for the user to enter the digits forming the requested telephone number and collects them as they are entered. The program then proceeds to block 405 upon collecting the last one of such digits.

Figure 9:
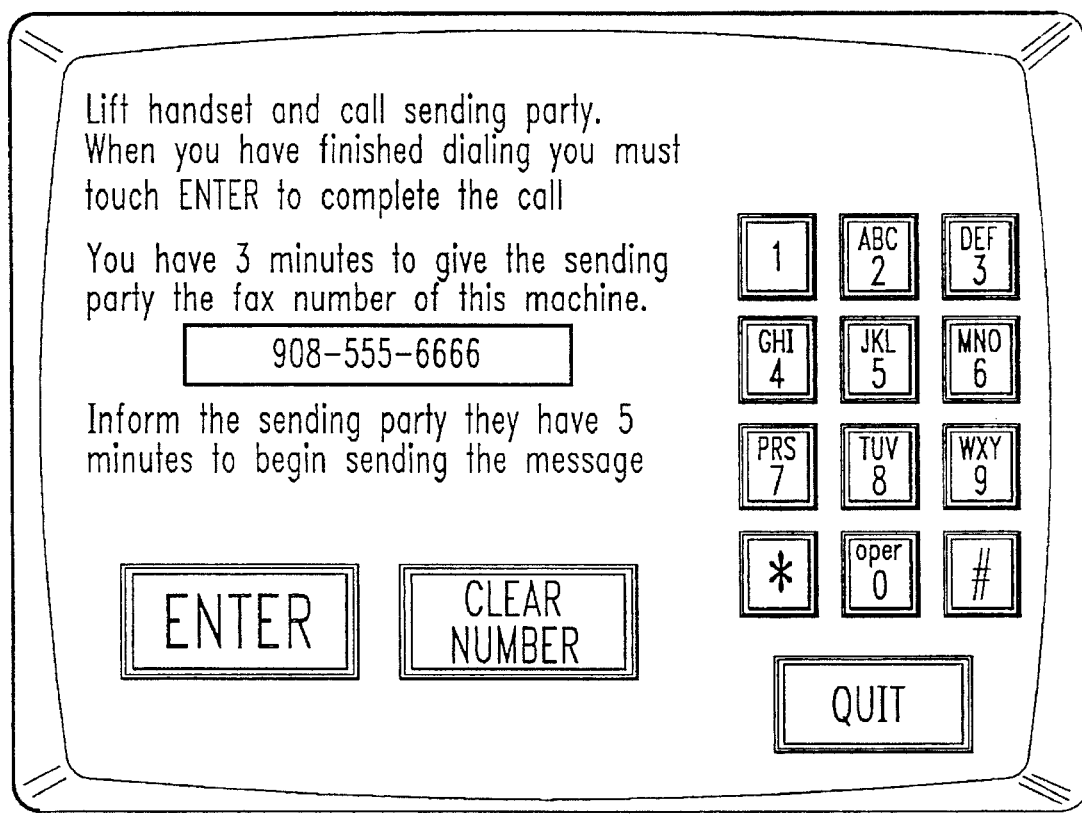

At blocks 405, the program displays instructions for placing a call to the party that will send the FAX to PFS 100 so that the user may pass the security code and PFS 100 FAX telephone number to that party. In particular, the program displays the aforementioned keypad for entering the called number and a number of buttons respectively designated "Enter", "Clear Number" and "Quit". (An illustrative example of the display is shown in FIG. 9) To place the call, the user removes handset 125 (FIG. 1) from its cradle and then enters the telephone number via the displayed keypad. The program collects the digits as they are entered. If the user desires to change the phone number, then all that user needs to do is to point to the displayed button labeled "Clear Number" and enter the new telephone number via the displayed keypad. When the user enters the last digit of the telephone number, he/she then points to the "Enter" button. In response thereto, the program at block 405 brings up on the display a button labeled "Ready to Receive ". In addition, the program places telephone line 150 in an off-hook state and dials the telephone number that the user entered. When the calling party answers and the user passes thereto the aforementioned security code and PFS 100 FAX telephone number, then the user returns handset 125 to its cradle and points to the displayed "Ready to Receive" button, thereby prompting the program to enter a facsimile receive mode.

In accord with an aspect of the invention, the program is arranged to wait a predetermined period of time—illustratively five minutes—for receipt of the FAX from the called party as represented by the dashed line 406. During the wait period, the program displays on display 110 the fact that it is waiting for receipt of the FAX and displays the amount of time that has elapsed since the user touched the displayed "Receive Ready" button.

If PFS 100 receives a telephone call within the aforementioned predetermined period of time, then the program proceeds to block 407. Otherwise, the program terminates its receive mode and proceeds to block 315 (FIG. 4). At block 407, the program waits for a predetermined period of time—illustratively 60 seconds—for receipt of the digits forming the aforementioned security code. If the digits are received within that period of time then the program proceeds to block 408. Otherwise, in accord with an aspect of the invention, the program terminates its receive mode and proceeds to block 315.

At block 408, the program proceeds to block 409 if the series of digits that it receives via the telephone connection compares with the security code that it had stored in its associated memory register. If the comparison turns out to be false, then the program proceeds to block 317. At block 409, the program places PFS 100 in a mode for receiving a facsimile via line 150 (FIG. 1). In that mode, PFS 100 modem circuitry transmits a carrier tone over line 150 for transmission to the sender's facsimile machine. The PFS 100 modem circuitry and the sender's facsimile machine then exchange signals for the purpose of establishing an operating mode, as mentioned above. Once the operating mode is established, then the sender's facsimile machine may begin transmitting the facsimile. During receipt of the facsimile, the program displays a message on display 110 indicating that the facsimile is being received and that PFS 100 receives all pages of the facsimile before printing them on plain paper. The program then proceeds to block 315 (FIG. 4) following the printing and outputting the FAX to chute 140.

Assume at this point that the user, in response to the menu of service items displayed at block 203, selects the menu item "Make a Copy". In that event then, the program proceeds to block 211. At block 211, the program in the manner discussed above in connection with block 302, requests that the user enter via touch screen 105 the size of the document to be copied, i.e., letter or legal size. The program then displays on display 110 instructions for entering the number of copies that the user desires. When the user enters that information, the program then displays instructions for scanning the document to be copied, as was similarly done at blocks 306 through 309. When the scanning of the page(s) of the document is completed, and the user has notified the program of that fact by pointing to an appropriate displayed button, then the program in response thereto prints and outputs to chute 140 the desired number of copies of the scanned document. The program then proceeds to block 315 (FIG. 4).

Assume at this point that the user, in response to the menu of service items displayed at block 203, selects the menu item "Broadcast a FAX"/Enhanced FAX. In that event then, the program proceeds to block 210. At block 210, the program displays on display 110 two buttons respectively designated "FAX Broadcast" and "Enhanced FAX Subscriber". If the user desires to broadcast a FAX, then the user may access that service by pointing to the former button. Assuming that the user does so, then the program in response to that selection proceeds to block 501 of FIG. 6 via blocks 302 through 309 (FIG. 3).

Figure 10:
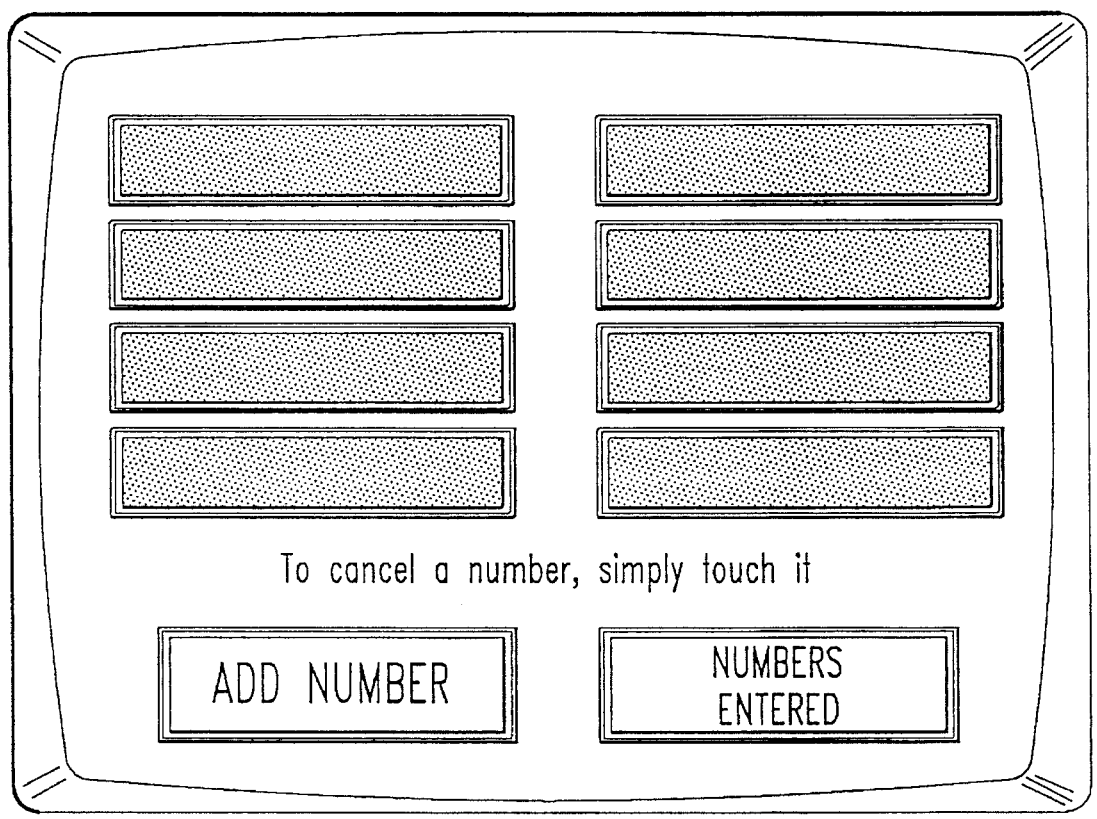

At block 501, the program displays on display 110 instructions for entering the telephone numbers of the recipients (destinations) of the FAX. The program also displays a number of blank widows and a number of buttons respectively designated "Add Number" and "Numbers Entered". (An illustrative example of the display is shown in FIG. 10.) The program then proceeds to block 502 where waits for the user to point to one of the two displayed buttons.

In particular, the user enters a destination telephone number by first pointing to the displayed "Add Number" button. The program in response thereto leaves block 502 and proceeds to block 503. At block 503, the program displays the aforementioned keypad and instructions for entering a telephone number. The program then collects the digits as they are entered and returns to block 501 where it redisplays the above-mentioned display. However, in doing so the program displays the telephone number that the user entered in a first one of the displayed windows. The user may then enter the telephone number of the next destination by once again pointing to the displayed "Add a Number" button. Similarly, the program proceeds to block 503 where it redisplays the keypad and collects the digits as they are entered the user. The program then returns to block 501 where it displays the telephone number that the user just entered in a next one of the displayed windows. (It is noted that the user may delete a displayed telephone number by pointing to the number. The program in response thereto erases the telephone number from display 110.) The user and the program interact with one another in the foregoing manner until the user enters the last of the destination telephone numbers and then points to the displayed "Numbers Entered" button, which causes the program to leave block 502 and proceed to block 504 via blocks 302 through 309 (FIG. 3) as represented in the FIG. by the dashes.

At block 504, the program causes PFS 100 to place a telephone call via telephone line 150 and network 200 to EFAX system 300 (FIG. 1). When the telephone connection is established and EFAX system 300 has transmitted the aforementioned announcement, then the program at block 505 transmits its EFAX system subscriber password, personal identification (ID) and the broadcast destination telephone numbers and delimiting signals, as discussed above. PFS 100 then transmits the user's scanned FAX to EFAX system 300 in accord with a negotiated operating mode. As mentioned above, during the transmission, the program (at block 506) displays on display 110 the fact that it is transmitting the user's FAX. It also displays (a) the telephone number of EFAX system 300, and (b) a message indicating that (i) the user may call a PFS 100 control agent to verify delivery of the user's FAX, and (ii) a unique reference number will be printed on the transaction summary that is outputted at block 317. The program then proceeds to block 315 following the transmission of the user's FAX.

(It is noted that EFAX system 300 stores in associated memory the information that it receives from PFS 100. Thereafter, EFAX system 300 places a telephone call to each destination telephone number that it received from PFS 100 and transmits the user's FAX to the called station, thereby completing the broadcast of the user's FAX in the manner described above.)

If the user subscribes to an enhanced FAX service, such as EFAX system 300, then the user may access the service via PFS 100 by merely pointing to the "EFAX Subscriber" button that the program displays at block 210. Assuming that the user does so, then the program leaves block 210 and proceeds to block 601 of FIG. 7. At block 601 the program displays on display 110 buttons representing respective services that EFAX system 300 provides to its subscribers. Such services include sending a FAX and accessing a so-called subscriber mailbox that is contained (stored) in EFAX system 300. Specifically, the program displays two buttons respectively designated "Send" and "Mailbox", and then waits for the user select one of those buttons. If the user points to the "Send" button, then the program leaves block 602 and proceeds to block 603 via blocks 302 through 309 (FIG. 3) as represented by the dashed line in FIG. 7. If, on the other hand, the user points to the "Mailbox" button, then the program proceeds to block 605.

Figure 11:
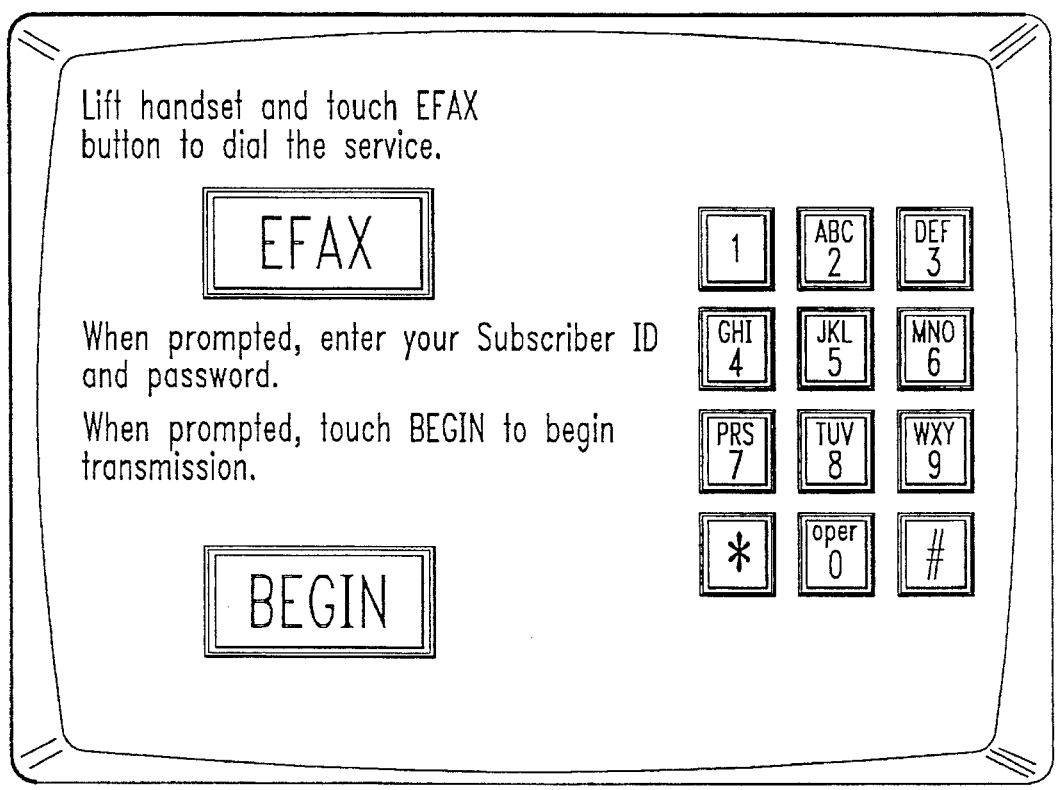

At block 603, the program displays on display 110 instructions for accessing EFAX system 300, the aforementioned keypad and two buttons respectively designated "EFAX" and "Begin". (An illustrative example of such a display is shown in FIG. 11.) In particular, to access EFAX system 300, the user removes handset 125 from its cradle, thereby causing PFS 100 to place telephone line 150 (FIG. 1) in an off-hook state. The user then points to the EFAX button as instructed. In response thereto, the program dials the telephone number of EFAX system 300. When the desired telephone connection is established via network 200 (FIG. 1), then EFAX system 300 in response thereto transmits prompts requesting that the subscriber enter his/her subscriber identification number (ID) and password. The user/subscriber enters such information by pointing to the appropriate buttons forming the displayed keypad. The program in response to the user pointing to a particular keypad digit causes PFS 100 circuitry to output signals representing the selected digit to telephone line 150. When the user/subscriber enters his/her password the user may then interact, in a conventional manner, with EFAX system 300 to access the desired "send" service. Upon accessing that service, the user enters via the displayed keypad the telephone number of each destination that is to receive the FAX that PFS 100 has just scanned.

At the completion of such interaction, the user/subscriber then points to the displayed "Begin" button. The program in response thereto proceeds to block 604 where it causes PFS 100 to negotiate a transmission operating mode with EFAX system 300, in the manner discussed above. When the operating mode is established, then PFS 100 transmits the facsimile that it has scanned during the aforementioned intermediate steps between blocks 602 and 603. The program then proceeds to block 315 (FIG. 4) following the transmission of the user's facsimile.

The program at block 605 similarly displays instructions for accessing EFAX system 300. As such, the above discussion relating to block 603 equally pertains to block 605 with the exception that the user interacts with EFAX system 300 to determine if one or more facsimile messages are stored in the user's assigned EFAX system 300 mailbox. If, as a result of such interaction, the user determines that a facsimile is not stored in his/her mailbox, then the user points to a displayed "Quit" button (not shown). In that event, then, the program leaves block 606 and proceeds to block 315 (FIG. 4). If a facsimile is stored in the user's mailbox, then the user may obtain a copy of each such facsimile by pointing to the displayed "Begin" button. Alternatively, the user may exit the service by pointing to the aforementioned displayed "Quit" button. If the user points to the displayed "Begin" button, then the program leaves block 606 and proceeds to block 607 where it enters a receive mode and waits for receipt of a carrier tone from EFAX system 300 and entry of the ensuing negotiations to establish a transmission operating mode.

When PFS 100 begins to receive the EFAX system 300 transmission, the program then displays on display 110 a message that the facsimile is being received and that the facsimile message will be printed and outputted when it is fully received. Thereafter, the program proceeds to block 315 (FIG. 4).

FIG. 12 is a simplified block diagram of PFS 100. As mentioned above, the overall operation of PFS 100 is under the control of computer 130. At the heart of computer 130 is a microprocessor 5 which communicates with its various peripherals via bus 70. These peripherals include ROM 10, RAM 15, hard disc unit 20 and various other peripherals denoted collectively at 25. The computer also includes a number of controllers for interfacing computer 130 with the functionalities discussed above. Specifically, graphics controller 40 operates at the direction of processor 5 to display the various screens discussed above on display 110. Touchscreen controller 45 determines if a user has touched touch screen 105 based on signals that controller 45 receives from touch screen 105. If that turns out to be the case, then controller 45 operating in conjunction with processor 5 and controller 40 determines the location of the touch point and correlates that location with graphics displayed on display 110. Computer 130 further includes controllers 50 and 55, which direct the operation of printer 145 and scanner 115, respectively, and controller 60, which interfaces credit card reader with bus 70. (It is noted that printer 145 is the model 4019E printer available from IBM, scanner 115 is the model SB-L301 scanner available from Pentex Inc., and credit card reader 120 is the model 21065075 reader available from Mag-Tek Inc.)

Telephone controller and modem 30, in particular, operate to connect telephone line 150 between handset 125 and conventional modem circuitry. Controller 30 also operates in conjunction with its modem to transmit and receive a facsimile. Dial network 35 is a circuit which operates under the control of controller 30 to dial out over line 150 a telephone number using multifrequency tones.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A facsimile machine having a plurality of operating modes including a receiving mode, said receiving mode comprising:

means, responsive to a user entering a request to use said receiving mode to receive a facsimile, for generating and outputting a unique security code to said user, means for communicating said unique security code requested by said user to a sender of a facsimile at another facsimile machine, said sender including the unique security code in sending a facsimile to said facsimile machine, and means, thereafter responsive to an incoming call connection from said other facsimile machine by said sender, for waiting a predetermined period of time for receipt of said unique security code via said connection, and for receiving a facsimile from said other facsimile machine via said connection only if said unique security code is received from said other facsimile machine during said predetermined period of time.

2. The facsimile machine of claim 1 wherein said means for receiving includes means for terminating said connection if said unique security code is not received within said predetermined period of time.

3. The facsimile machine of claim 1 wherein said means for waiting includes means for transmitting over said connection a prompt designed to urge a user of said other facsimile machine to enter said unique security code.

4. The facsimile machine of claim 1 wherein said facsimile machine includes a facsimile transmission mode for transmitting a facsimile to said other facsimile machine.

5. The facsimile machine of claim 4 wherein said facsimile machine is a public facsimile machine associated with an enhanced facsimile service, and wherein said transmission mode includes means, responsive to a user inputting a request to transmit a facsimile to a plurality of destinations, for establishing a communications connection to said enhanced facsimile service and sending said user's facsimile as well as said destinations to said enhanced facsimile service for delivery to each of said destinations.

6. A facsimile machine comprising:

means, responsive to a user entering a request to use said facsimile machine to receive a facsimile from another facsimile machine, for outputting a unique security code to said user, means for communicating said unique security code requested by said user to a sender of a facsimile at said other facsimile machine, said sender including the unique security code in sending a facsimile to said facsimile machine, and means for receiving a call via a communications path and for requesting entry of said unique security code, and for inhibiting the operation of said receiving means if said security code is not received via said communications path prior to receipt of said facsimile.

7. The facsimile machine of claim 6 wherein said means for inhibiting includes means, operative in the event that said security code is so received, for continuing communications with said other facsimile machine in order to receive said facsimile.

8. The facsimile machine of claim 6 wherein said means for receiving includes means, operative prior to receipt of said facsimile, for transmitting over said communications path a prompt urging a user of said other facsimile machine to enter said unique security code.

9. The facsimile machine of claim 8 wherein said means for transmitting includes means for terminating said communications if said predetermined security code is not received within a predetermined period of time of said prompt.

10. The facsimile machine of claim 6 wherein said facsimile machine is a public facsimile machine and is a subscriber of an enhanced facsimile service and wherein said public facsimile machine includes means for transmitting a facsimile and means, responsive to a user requesting transmission of a facsimile to a plurality of destinations, for establishing a communications connection to said enhanced facsimile service and transmitting said user facsimile to said enhanced facsimile service for delivery to each of said destinations.

* * * * *